United States Patent [19]

Yoshioka et al.

[11] Patent Number: 5,351,486
[45] Date of Patent: Oct. 4, 1994

[54] CHARGING CONTROL APPARATUS FOR AN INTERNAL COMBUSTION ENGINE WITH A DUAL TURBOCHARGER SYSTEM

[75] Inventors: Mamoru Yoshioka; Kunihiko Nakata, both of Susono; Akira Kotani, Toyoto; Makoto Makino, Aichi, all of Japan

[73] Assignee: Toyota Jidosha Kabushiki Kaisha, Japan

[21] Appl. No.: 178,536

[22] Filed: Jan. 6, 1994

Related U.S. Application Data

[62] Division of Ser. No. 924,551, Jul. 31, 1992, Pat. No. 5,313,798.

[30] Foreign Application Priority Data

Aug. 2, 1991 [JP] Japan ................. 3-216521
Oct. 4, 1991 [JP] Japan ................. 3-284097
Oct. 8, 1991 [JP] Japan ................. 3-287204

[51] Int. Cl.⁵ ............................................. F02B 37/12
[52] U.S. Cl. ............................................. 60/612
[58] Field of Search ................................... 60/612

[56] References Cited

U.S. PATENT DOCUMENTS

3,038,297  6/1962  Kauffmann .
4,474,008  10/1984  Sakurai .
4,781,027  11/1988  Richter .
4,793,140  12/1988  Esch .
4,982,567  1/1991  Hashimoto .
5,003,781  4/1991  Shibata .
5,005,359  4/1991  Tashima .
5,035,114  7/1991  Shibata .
5,036,663  8/1991  Akagi .
5,050,452  9/1991  Morioka .............. 60/612 X
5,081,842  1/1992  Sugiyama .
5,154,057  10/1992  Yoshioka et al. .......... 60/612 X

FOREIGN PATENT DOCUMENTS

2-042123  2/1990  Japan .
2-191816  7/1990  Japan .
2-256828  10/1990  Japan .
2-259325  10/1990  Japan .............. 60/612
3-222821  10/1991  Japan .............. 60/612
3-225029  10/1991  Japan .............. 60/612

*Primary Examiner*—Michael Koczo
*Attorney, Agent, or Firm*—Cushman, Darby & Cushman

[57] ABSTRACT

A charging control apparatus including means for shortening a running-up period of the second turbocharger with an exhaust bypass valve when an instant engine speed is low, so that torque shock during the transition from one-turbocharger-operation to two-turbocharger-operation is decreased. During rapid acceleration at high engine speeds, an exhaust switching valve is opened at once. Further, the reference engine speed and the reference intake air quantity for switching to two-turbocharger-operation are varied in accordance with the gear shift position, so that an optimum switching to two-turbocharger-operation is obtained.

4 Claims, 12 Drawing Sheets

CHARGING CONTROL APPARATUS FOR AN INTERNAL COMBUSTION ENGINE WITH A DUAL TURBOCHARGER SYSTEM

This is a division of application Ser. No. 07/924,551, filed Jul. 31, 1992, U.S. Pat. No. 5,313,798.

BACKGROUND OF THE INVENTION

1. Field of the Invention

The present invention relates to a charging control apparatus for an internal combustion engine with a dual turbocharger system which can suppress a decrease in charging pressure during a transition from "one-turbocharger-operation" to "two-turbocharger-operation."

2. Description of the Related Art

An internal combustion engine with a dual turbocharger system is shown in Japanese Patent Publication HEI 3-138,420 (which corresponds to U.S. Pat. No. 5,081,842).

The dual turbocharger system includes a first turbocharger operated at all intake air quantities and a second turbocharger operated solely at large intake air quantities. More particularly, an intake switching valve is installed in a portion of the intake conduit located downstream of the compressor of the second turbocharger and an exhaust switching valve is installed in a portion of the exhaust conduit located downstream or upstream of the turbine of the second turbocharger. When the intake switching valve and the exhaust switching valve are closed, operation of the second turbocharger is stopped and only the first turbocharger is in operation. When the intake switching valve and the exhaust switching valve are open, both the second turbocharger and the first turbocharger are in operation. To make the switch from "one-turbocharger-operation" to "two-turbocharger-operation" smooth, an exhaust bypass conduit is provided to bypass the exhaust switching valve and an exhaust bypass valve is installed in the exhaust bypass conduit. Before the intake switching valve and the exhaust switching valve are opened, the exhaust bypass valve is opened so that the second turbocharger is preliminarily rotated or run-up. In the conventional turbocharged engine, the switching timing from "one-turbocharger-operation" to "two-turbocharger-operation" and the duration of the running-up of the exhaust bypass valve are a constant with respect to the engine speed or intake air quantity.

However, there are the following problems with the conventional turbocharged engine:

(a) The running-up characteristic of the second turbocharger varies in accordance with the engine speed or intake air quantity. Therefore, if the duration of the running-up of the second turbocharger is fixed so as to be optimum for high engine speeds, the duration of the running-up is too short for a low engine speed and the torque shock during the transition from "one-turbocharger-operation" to "two-turbocharger-operation" will be large at low engine speeds.

(b) On the other hand, if the duration of the running-up of the second turbocharger is fixed so as to be optimum for low engine speeds, the duration of the running-up is too long for high engine speeds and an overrun of the first turbocharger will occur at the switching from "one-turbocharger-operation" to "two-turbocharger-operation."

(c) When the engine speed or intake air quantity exceeds the predetermined value for switching from "one-turbocharger-operation" to "two-turbocharger-operation", the exhaust switching valve will be delayed in opening as a result of various mechanical delays and the exhaust gas flow resistance will be increased and the engine output will be suppressed until the exhaust switching valve is completely open. Since the mechanical delay is constant, independent of a change of the engine load, the engine output will be seriously affected by the exhaust gas flow resistance during rapid acceleration at high engine speeds.

(d) Because the operation of the conventional turbocharged engine including start of the exhaust bypass valve and switching from "one-turbocharger-operation" to "two-turbocharger-operation" is based on fixed engine speed or intake air quantity, the intake air quantity can reach a predetermined intake air quantity for switching too quickly when the gear shift position is at low positions. As a result, at low gear shift positions, the running-up of the exhaust bypass valve is insufficient and a relatively large torque shock tends to occur during switching from "one-turbocharger-operation" to "two-turbocharger-operation".

SUMMARY OF THE INVENTION

An object of the invention is to provide a charging control apparatus for an internal combustion engine with a dual turbocharger system wherein torque shock during the transition from "one-turbocharger-operation" to "two-turbocharger-operation" is suppressed at various engine operating conditions.

BRIEF DESCRIPTION OF THE DRAWINGS

The above described object and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
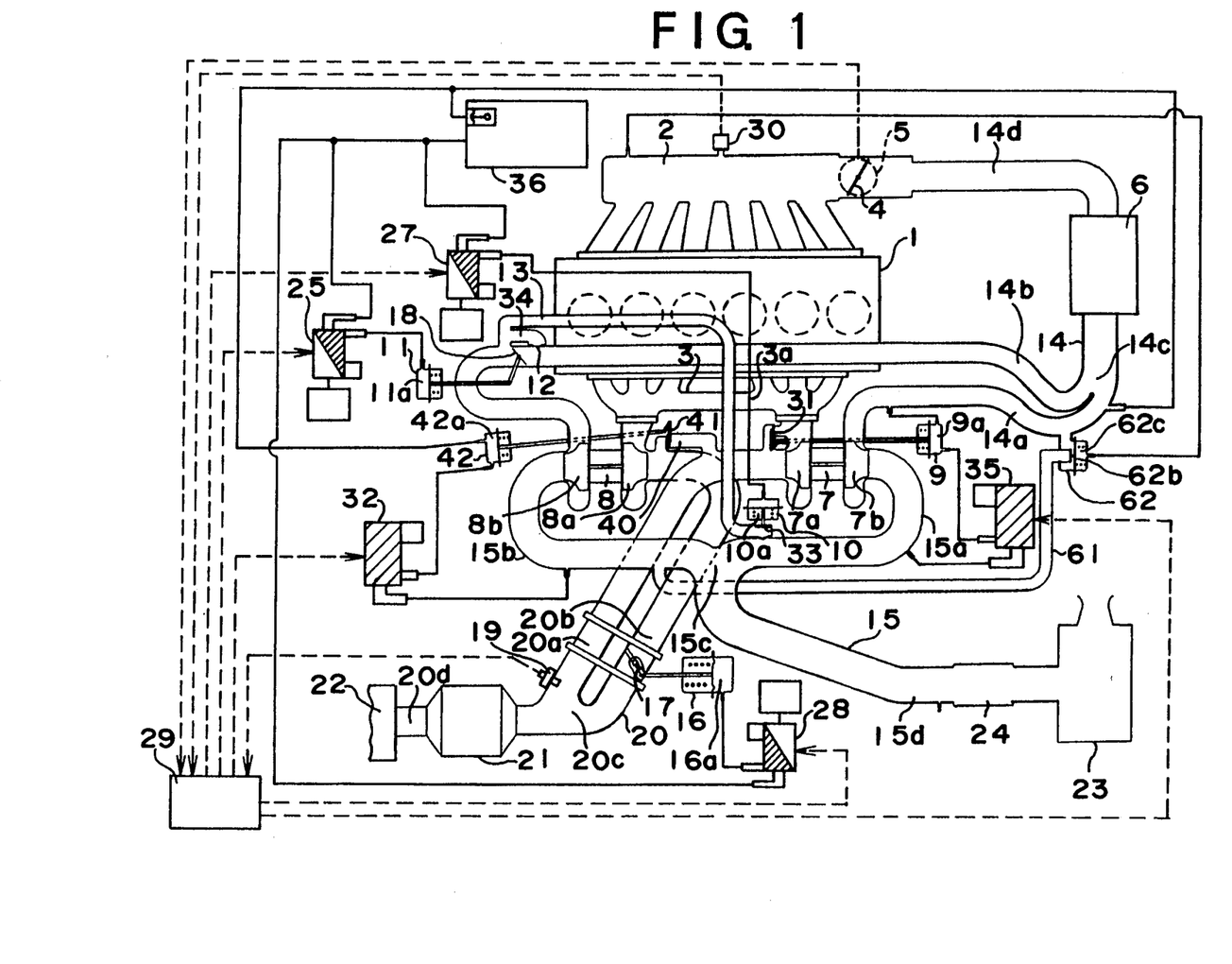
FIG. 1 is a schematic view of a charging control apparatus for an internal combustion engine with a dual turbocharger system in accordance with the invention.
Figure 2:
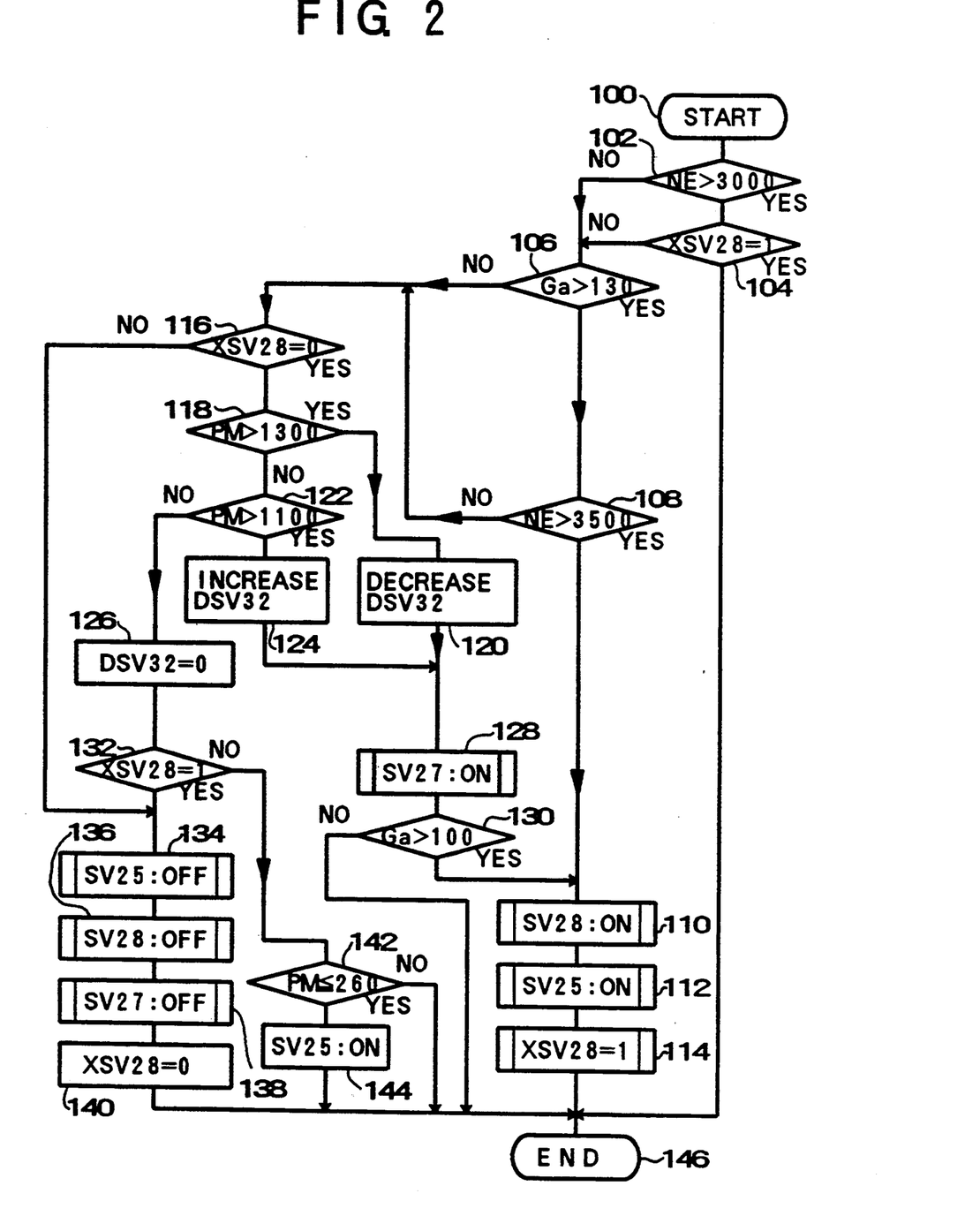
FIG. 2 is a flow chart illustrating the basic operation control of the apparatus of FIG. 1.

FIGS. 1 and 2 illustrate structures common to all embodiments of the invention. Thus, common structures will be described first.

As illustrated in FIG. 1, a charging pressure control apparatus for an internal combustion engine with a dual turbocharger system in accordance with all embodiments of the present invention includes a multi-cylinder engine. As an example, FIG. 1 depicts a six-cylinder internal combustion engine 1 with an air intake and an exhaust outlet. The cylinders of the engine 1 are grouped into two groups. An exhaust manifold 3 is connected with the engine exhaust outlets and includes a first portion connected with the first group of engine cylinders and a second portion connected with the second group of engine cylinders. The first and second portions of the exhaust manifold 3 communicate with each other via a connecting conduit 3a.

A first turbocharger 7 and a second turbocharger 8 are positioned in parallel with each other with respect to the engine 1. The first turbocharger 7 is operated throughout all intake air quantities, and the second turbocharger 8 is operated only at large intake air quantities. The first turbocharger 7 includes a turbine 7a and a compressor 7b driven by the turbine 7a. Similarly, the second turbocharger 8 includes a turbine 8a and a compressor 8b driven by the turbine 8a. The turbine 7a is connected with the first portion of the exhaust manifold 3 and the turbine 8a is connected with the second portion of the exhaust manifold 3. As a result, the first and second turbines 7a and 8a are connected to the engine exhaust outlet via the exhaust manifold 3. The compressor 7b and the compressor 8b are connected with the air intake of the engine 1 via a portion of an intake line.

The intake line connected with the engine air intake includes a first intake passage 15 positioned upstream of the compressors 7b and 8b and a second intake passage 14 positioned downstream of the compressors 7b and 8b. The first intake passage 15 includes a first intake pipe 15a located upstream of and connected with the compressor 7b, a second intake pipe 15b located upstream of and connected with the compressor 8b, a connecting portion 15c where the first intake pipe 15a and the second intake pipe 15b join each other, and a con, non intake pipe 15d located upstream and connected with the connecting portion 15c. Similarly, the second intake passage 14 includes a first intake conduit 14a located downstream of and connected with the compressor 7b, a second intake conduit 14b located downstream of and connected with the compressor 8b, a connecting portion 14c where the first intake conduit 14a and the second intake conduit 14b join each other, and a common intake conduit 14d connecting the connecting portion 14c with the engine air intake. In the con, non intake pipe 15d, an air cleaner 23 and an air flow meter 24 are installed in that order in the downstream direction. In the common intake conduit 14d, an intercooler 6, a throttle valve 4, and a surge tank 2 are installed, in that order in the downstream direction.

An exhaust line 20, connected to the engine exhaust outlets, includes a first exhaust conduit 20a connected to the first portion of the exhaust manifold 3, a second exhaust conduit 20b connected to the second portion of the exhaust manifold 3, a connecting portion 20c where the first exhaust conduit 20a and the second exhaust conduit 20b join each other, and a common exhaust pipe 20d located downstream of and connected to the connecting portion 20c. Turbines 7a and 8a are positioned within the first exhaust conduit 20a and the second exhaust conduit 20b, respectively. In the exhaust pipe 20d, a catalytic converter 21 and an exhaust muffler 22 are installed in that order in the downstream direction. Furthermore, an oxygen sensor 19 is installed at or in the vicinity of the connecting portion 20c.

For the purpose of switching between "one-turbocharger-operation," where only the first turbocharger 7 operates at small to medium intake air quantities, and "two-turbocharger-operation," where both the first turbocharger 7 and the second turbocharger 8 operate at large intake air quantities, an exhaust switching valve 17 is installed in the second exhaust conduit 20b downstream of the turbine 8a, and an intake switching valve 18 is installed in the second intake conduit 14b downstream of the compressor 8b. When both the exhaust switching valve 17 and the intake switching valve 18 are closed, the operation of the second turbocharger 8 is stopped and only the first turbocharger 7 is in operation. In contrast, when both the exhaust switching valve 17 and the intake switching valve 18 are open, both the first turbocharger 7 and the second turbocharger 8 are in operation.

For the purpose of minimizing the shock which typically accompanies the transition from "one-turbocharger-operation" to "two-turbocharger-operation", the second turbocharger 8 should be run-up before it is fully rotated. An exhaust bypass conduit 40 is provided which bypasses the exhaust switching valve 17, and the second turbocharger 8 is run-up by opening an exhaust bypass valve 41 installed in the exhaust bypass conduit 40. More particularly, when the exhaust bypass valve 41 is opened, a relatively small amount of exhaust gas flows through the exhaust bypass conduit 40 to run-up the second turbocharger 8. When the exhaust switching valve 17 is then open, the rotational speed of the second turbocharger 8 is increased from the run-up rotational speed to a "two-turbocharger-operation" rotational speed. As a result, the reduced increment in the rotational speed effectively attenuates the transition shock.

When the second turbocharger 8 is preliminarily rotated and the intake switching valve 18 is closed, a portion of the pressurized air located in the second intake conduit 14b between the compressor 8b and the intake switching valve 18, will leak upstream through the compressor 8b and flow to a portion of the second intake pipe 15b upstream of the compressor 8b. This leaked air will then again be driven by the compressor 8b and compressed into the portion of the intake conduit downstream of the compressor 8b. This leakage and re-pressurization of the intake air repeats and undesirably increases the temperature of the intake air and thus, the temperature of the impeller of the compressor 8b itself. To prevent such temperature increases, an intake bypass conduit 13 is provided to allow the compressed air to bypass the compressor 8b of the second turbocharger 8. More particularly, the intake bypass conduit 13 connects the portion of the second intake conduit 14b positioned between the compressor 8b and the intake switching valve 18 with the first intake passage 15. An intake bypass valve 33 is installed in and is adapted to open and close the intake bypass conduit 13. When the second turbocharger 8 is preliminarily rotated, the intake bypass valve 33 is opened to minimize the intake air temperature increase.

An intake switching valve bypass conduit 34 is provided to connect a portion of the second intake conduit 14b positioned upstream of the intake switching valve 18 with a portion of the intake conduit 14b positioned downstream of the intake switching valve 18 to bypass the intake switching valve 18. A one-way check valve 12 is installed in the intake switching valve bypass conduit 34. The check valve 12 permits the intake air to flow from the portion of the second intake conduit 14b positioned upstream of the intake switching valve 18 toward the portion of the second intake conduit 14b positioned downstream of the intake switching valve 18. As a result, when the intake switching valve 18 is closed and the compressor outlet pressure of the second turbocharger 8 exceeds a compressor outlet pressure of the first turbocharger 7, the check valve 12 opens the intake switching valve bypass conduit 34 and permits the intake air to flow downstream.

Further, the turbine 7a is provided with a waste gate valve 31 which is installed in a first turbocharger turbine bypass conduit bypassing the first turbocharger turbine 7a. Additionally, a positive pressure tank 36 connected with a portion of the common intake conduit 14d upstream of the intercooler 6 and holds a charging pressure therein.

During a rapid deceleration, the throttle valve 4 is rapidly closed. As a result, the intake air pressure upstream of the throttle valve 4 may increase, which then produces a pressure reflection at the throttle valve 4. The pressure reflection causes a surging and a sound at the compressor 7b during "one-turbocharger-operation" and at the compressors 7b and 8b during "two-turbocharger-operation". To prevent such surging, an air bypass conduit 61 is connected at one end to a portion of the second intake passage 14 positioned upstream of the throttle valve 4 and at the other end to a portion of the first intake passage 15. An air bypass valve 62 is installed in the air bypass conduit 61 and is adapted to open and close the air bypass conduit 61 during a rapid deceleration.

The air bypass valve 62 includes a diaphragm 62b having a first side and an opposite second side. The first side of the diaphragm 62b is connected to the interior of the air bypass conduit 61 so that the charging pressure transmitted through the air bypass conduit 61 directly acts on the diaphragm 62b from the first side of the diaphragm 62b to open the air bypass conduit 61. Since the valve opening force acts directly on the diaphragm 62b, the air bypass valve 62 has a quick response to effectively suppress a surging during a rapid deceleration. The air bypass valve 62 also includes a diaphragm chamber 62c on the second side of the diaphragm 62b. The diaphragm chamber 62c is connected to a portion of the intake line downstream of the throttle valve 4. The air bypass valve 62 automatically opens and closes without being controlled by a computer.

Various actuators operate the above-described valves except the air bypass valve 62. As shown in FIG. 1, actuator 9 operates the waste gate valve 31, actuator 10 operates the intake bypass valve 33, actuator 11 operates the intake switching valve 18, actuator 16 operates the exhaust switching valve 17, and actuator 42 operates the exhaust bypass valve 41.

Each of these actuators is constructed of a diaphragm-type actuator. The actuator 16 includes a diaphragm chamber 16a, the actuator 10 includes a diaphragm chamber 10a, the actuator 11 includes a diaphragm chamber 11a, the actuator 42 includes a diaphragm chamber 42a, and the actuator 9 includes a diaphragm chamber 9a. Each diaphragm chamber 16a, 10a, 11a, 42a, and 9a communicates with the positive pressure tank 36 or a portion of the second intake passage 14 upstream of the throttle valve 4 so that the charging pressure is introduced to each diaphragm chamber. The diaphragm chamber 9a and 42a also communicate with the first intake passage 15 so that atmospheric pressure can be introduced to the diaphragm chambers 9a and 42a.

Various three-way or two-way solenoid valves 25, 27, 28, 32, and 35, respectively switch the actuators 11, 10, 16, 42, and 9 on and off. The two-way solenoid valve 32 for operating the actuator 42 of the exhaust bypass valve 41 and the two-way solenoid valve 35 for operating the actuator 9 of the waste gate valve 31 are duty-control valves. The opening degree of a duty control valve can be controlled by the duty ratio thereof as is well known. The duty control solenoid valve 32 is installed in a pressure bleed line connected between the diaphragm chamber 42a and the first intake passage 15. The duty control solenoid valve 35 is installed in a pressure bleed line connected between the diaphragm chamber 9a and the first intake passage 15. These solenoid valves 25, 27, 28, 32 and 35 operate according to the instructions from an engine control computer 29 (or an electronic control unit).

In this instance, an "ON" setting of the three-way solenoid valve 25 actuates the actuator 11 to open the intake switching valve 18 and an "OFF" setting of the three-way solenoid valve 25 actuates the actuator 11 to close the intake switching valve 18. Similarly, an "ON" setting of the three-way solenoid valve 28 actuates the actuator 16 to open the exhaust switching valve 17 and an "OFF" setting of the three-way solenoid valve 28 actuates the actuator 16 to close the exhaust switching valve 17. An "ON" setting of the three-way solenoid valve 27 actuates the actuator 10 to close the intake bypass valve 33 and an "OFF" setting of the three-way solenoid valve 27 actuates the actuator 10 to open the intake bypass valve 33. An increase control of the duty ratio of the two-way duty control solenoid valve 32 actuates the actuator 42 to open the exhaust bypass valve 41 and a decrease control of the duty ratio of the two-way duty control solenoid valve 32 actuates the actuator 42 to close the exhaust bypass valve 41. Similarly, an increase control of the duty ratio of the two-way duty control solenoid valve 35 actuates the actuator 9 to open the waste gate valve 31 and a decrease control of the duty ratio of the two-way duty control solenoid valve 35 actuates the actuator 9 to close the waste gate valve 31.

Various sensors for sensing the engine operating conditions are provided and the outputs of the sensors are fed to the engine control computer 29 (or the electronic control unit). More particularly, the various sensors include an intake pressure sensor 30, a throttle opening degree detecting sensor 5, an intake air quantity detecting sensor such as an air flow meter 24, the aforementioned oxygen sensor 19, an engine speed or crank angle sensor (not shown), and a vehicle speed sensor (not shown).

The engine control computer 29 (or the electronic control unit) includes a central processor unit (CPU), a read-only memory (ROM), a random access memory (RAM), an input and output interface (I/O interface), and an analog/digital convertor (A/D convertor) like a typical micro computer. The program of FIG. 2 is stored in the ROM and is fed into the CPU where the routine is executed to operate the above-described valves and actuators.

Basic control structures and operation of the turbocharged engine will now be explained with reference to FIG. 2. The routine of FIG. 2 starts at step 100 at predetermined time intervals. At step 102, the routine determines whether the current engine speed NE is larger than a predetermined speed (for example, 3,000 rpm). At step 106, the routine determines whether the current intake air quantity Ga is larger than a predetermined air quantity (for example, 130 g/sec). When the intake air quantity Ga surpasses 130 g/sec for the first time, the routine proceeds from step 100 to step 106 via step 102. The routine then proceeds to step 110 via step 108, where the solenoid valve 28 is switched to "ON" to open exhaust switching valve 17. Subsequently, the routine proceeds to step 112 where the solenoid valve 25 is switched to "ON" to open the intake switching valve 18 to produce the "two-turbocharger-operation". The routine proceeds to step 114 where an exhaust switching valve opening flag XSV28 is set to "1". The cycle ends at step 146. During subsequent cycles, if the engine speed NE is greater than 3,000 rpm, the routine proceeds from step 100 to step 104 via step 102. Since flag XSV28 was set to "1" at step 114 during the first cycle, the routine proceeds from step 104 to step 146, and at step 146 the cycle ends.

When the current intake air quantity Ga is less than the predetermined intake air quantity (for example, 130 g/sec) or changes from a quantity greater than 130 g/sec to a quantity less than 130 g/sec, the routine proceeds from step 100 to step 106 via step 102 and further to step 116. When the intake air quantity decreases to a quantity less than 130 g/sec, the flag XSV28 has previously been set to "1". Therefore, in the first cycle after the intake air quantity drop, the routine proceeds from step 116 to step 134 where the solenoid valve 25 is switched to "OFF" to close the intake switching valve 18. At step 136, the solenoid valve 28 is switched to "OFF" to close the exhaust switching valve 17 producing the "one-turbocharger-operation". At step 138, the solenoid valve 27 is switched to "OFF" to open the intake bypass valve 33. At step 140, flag XSV28 is set to "0" to indicate that the exhaust switching valve 17 is closed. Finally, step 146 ends the cycle.

Since flag XSV28 is set at "0", in the subsequent cycles, the routine proceeds from step 116 to step 118. Steps 118 to 126 are steps for controlling the exhaust bypass valve 41. When the current intake pressure PM is less than a predetermined pressure Pc for beginning feed back control of the duty control selenoid valve 32 (for example, 1100 mm Hg in absolute pressure) at low or intermediate engine loads, the routine proceeds from step 118 to step 126 via step 122, where the duty ratio DSV32 of the two-way duty control solenoid valve 32 is set to 0% to close the exhaust bypass valve 41. Then, the routine proceeds to step 132, and then, since flag XSV28 has been set to "0", the routine proceeds to step 146 via steps 142 and 144, where the cycle ends. At step 142, it is determined whether the intake pressure is equal to or less than a predetermined negative pressure (for example, 260 mmHg in absolute pressure). If the intake pressure is equal to or less than the predetermined pressure and therefore the engine load is at low loads, the routine proceeds to step 144 where the solenoid valve 25 is switched to "ON" to open the intake switching valve 18 so that the intake air can be sucked through both the first turbocharger compressor 7b and the second turbocharger compressor 8b to improve the acceleration characteristic from the low engine load.

When the current intake air quantity Ga increases and approaches 100 g/sec, the intake pressure PM exceeds 1,100 mm Hg. As a result, the exhaust bypass valve 41 must be open to run-up the second turbocharger 8 to obtain a smooth transition from the "one-turbocharger-operation" to the "two-turbocharger-operation" and to control the charging pressure to a predetermined objective pressure Po (for example, 1,300 mmHg in absolute pressure). In such a condition, the routine proceeds from step 116 to step 124 via steps 118 and 122, where the duty ratio of the two-way duty control solenoid valve 32 is increased by a predetermined amount (for example, 2%) per cycle so that the exhaust bypass valve 41 opens gradually. In this instance, if the duty ratio exceeds 100% at step 124, the duty ratio is cut to 100% at step 126. The routine then proceeds from step 124 to step 128, where the three-way solenoid valve 27 is switched to "ON" to close the intake bypass valve 33. Then, the routine proceeds to step 130, and if the current intake air quantity Ga exceeds a predetermined amount (for example 100 g/sec), the routine proceeds to steps 110 and 112 to produce the "two-turbocharger-operation". However, if the current intake air quantity Ga does not exceed 100 g/sec, the second turbocharger 8 has not yet been run-up sufficiently, and therefore, the routine proceeds from step 130 to step 146 where the cycle ends. If PM is determined to be greater than the predetermined objective pressure (for example, 1,300 mmHg in absolute pressure) at step 118, the duty ratio DSV32 of the two-way solenoid valve 32 is decreased so that the charging pressure is controlled to the predetermined objective pressure Po (for example, 1,300 mmHg in absolute pressure). In this instance, if the duty ratio is less than 0% at step 120, the duty ratio is cut to 0% at step 120.

Charging control specific to each embodiment of the invention will now be explained..

Figure 3:
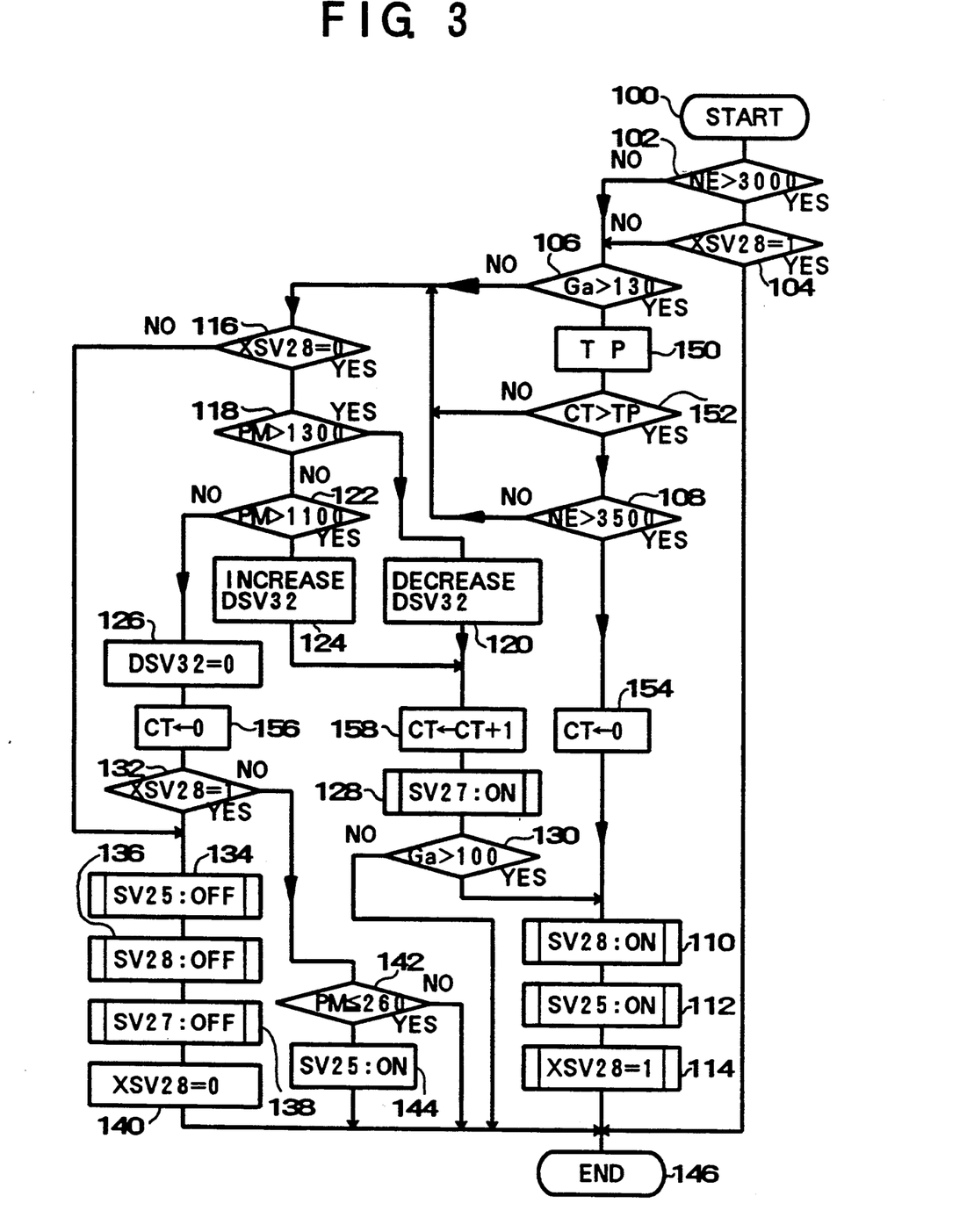
FIG. 3 is a flow chart of the charging control in accordance with a first embodiment of the invention.
Figure 4:
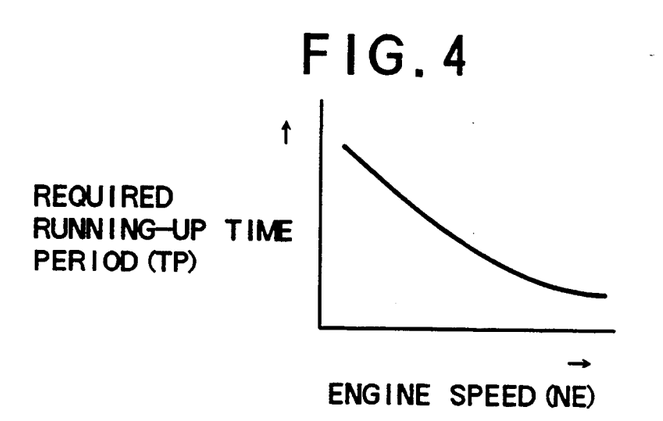
FIG. 4 is a graphical representation of a map used in the charging control of the first embodiment and illustrating the relationship between the required duration of the running-up of the second turbocharger and the engine speed or the intake air quantity.

The first embodiment of the invention is illustrated in FIGS. 3 through 8. The first embodiment relates to an improvement in the charging control from "one-turbocharger-operation" to "two-turbocharger-operation" by the exhaust bypass valve 41 and is adapted to suppress a serious decrease in the charging pressure or the torque during the transition from "one-turbocharger-operation" to "two-turbocharger-operation", which may occur at low engine speeds with the control according to the routine of FIG. 2. In the first embodiment, as shown in FIG. 3, steps 150 to 158 are added to the routine of FIG. 2. The remaining steps are the same as those of FIG. 2.

As shown in FIG. 3, at step 106 it is determined whether the intake air quantity Ga is greater than the predetermined quantity (for example, 130 g/sec). If Ga is greater than the predetermined intake air quantity, the routine proceeds to step 150 where the required running-up time period (duration) TP of the second turbocharger 8 is determined using the map of FIG. 4, which defines the relationship between the required running-up period TP and engine speed NE. In the map, the relationship is predetermined such that the lower the engine speed NE is, the larger the required duration of the running period TP.

Then, the routine proceeds to step 152, where it is determined whether the count time CT of the exhaust bypass valve 41 (counted after the exhaust bypass valve 41 begins to open) exceeds the required running-up period TP. When the exhaust bypass valve 41 begins to open, the second turbocharger 8 begins to be run-up. When the count time CT exceeds the required running-up period TP at step 152, the routine proceeds to steps 110 and 112 via steps 108 and 154 and the operation is switched from "one-turbocharger-operation" to "two-turbocharger-operation". If the count time CT does not exceed the required running-up period TP at step 152, the routine proceeds to step 116. As a result, switching to "two-turbocharger-operation" is delayed until CT exceeds TP.

Step 154 clears the count time CT when the instant operation is in "two-turbocharger-operation". Step 156 also clears the count time CT when the instant operation is in "one-turbochager-operation", before the exhaust bypass valve 41 begins to operate. Step 158 counts-up the count time CT after the exhaust bypass valve 41 begins to open to thereby run-up the second turbocharger 8 until the intake switching valve 18 and the exhaust switching valve 17 are opened to switch the engine operation to "two-turbocharger-operation". In accordance with the first embodiment, since the required running-up period TP is large when the engine speed is large, switching to "two-turbocharger-operation" is delayed at low engine speeds.

Thus, in this instance, steps 150 and 152 define means for lengthing the duration of running-up of the second turbocharger 8 by the exhaust bypass valve 41 at low engine speeds or small intake air quantities. Thus, the end of the running-up period of the second turbocharger 41 is delayed at low engine speeds or small intake air quantities.

Figure 5A:
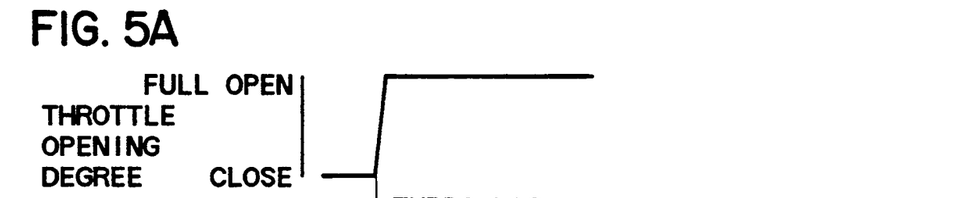
FIG. 5 is a graphical representation of the intake pressure and turbocharger speed versus time characteristic during the start-up of the engine of FIG. 1.
Figure 5B:
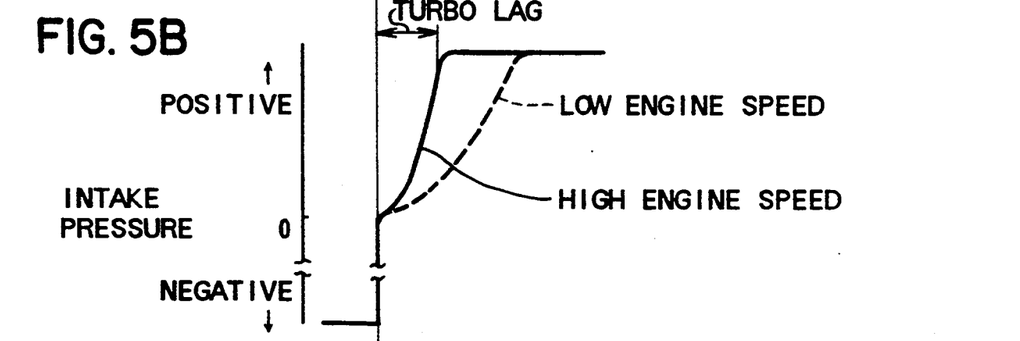
Figure 5C:
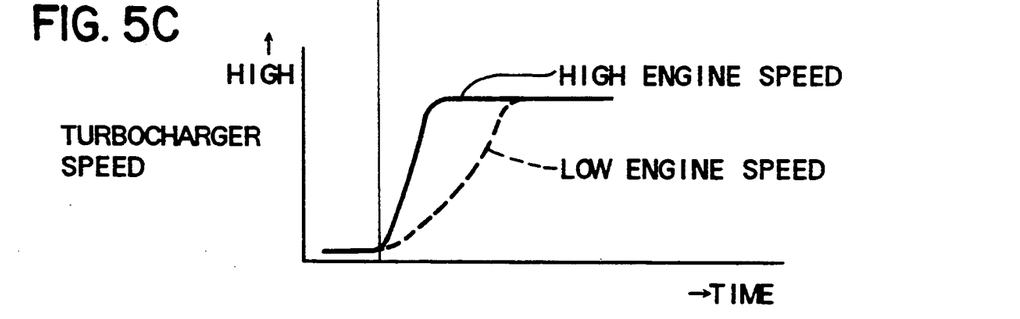
Figure 6:
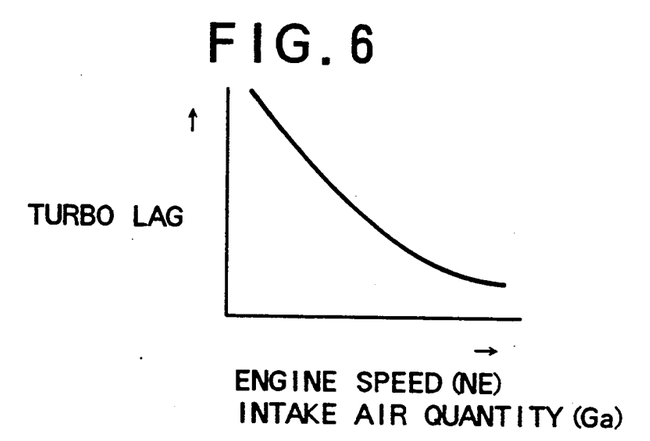
FIG. 6 is a graphical representation of the turbo lag versus engine speed (or intake air quantity) characteristic of the the engine of FIG. 1.
Figure 7A:
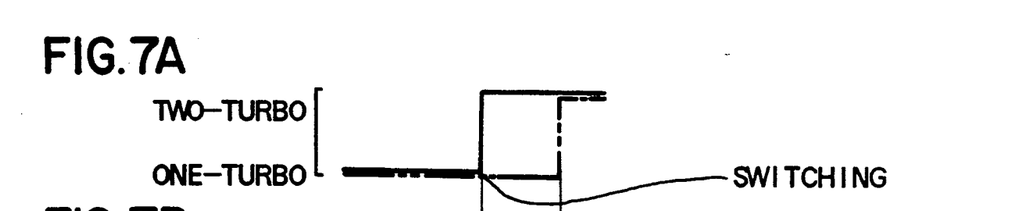
FIG. 7 is a graphical representation of the intake pressure and turbocharger speed versus time characteristic in accordance with the first embodiment of the invention.
Figures 7B, 7C:
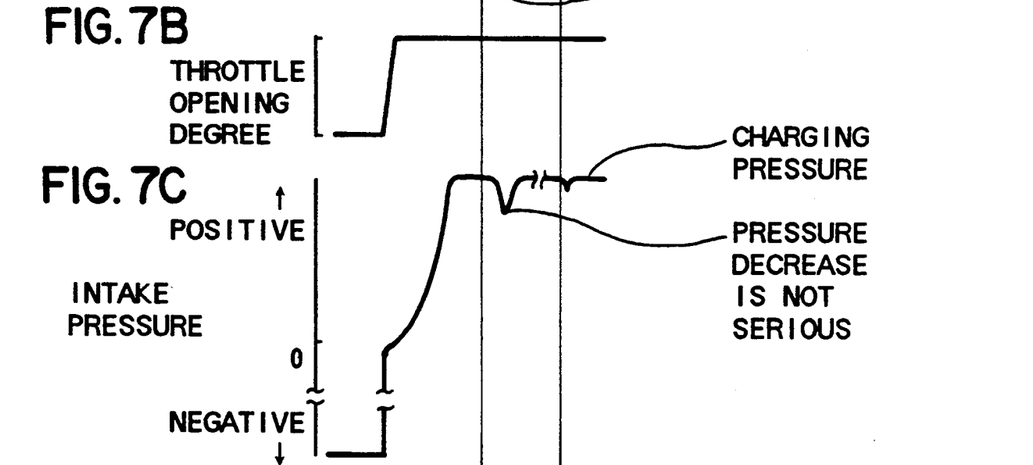
Figure 7D:
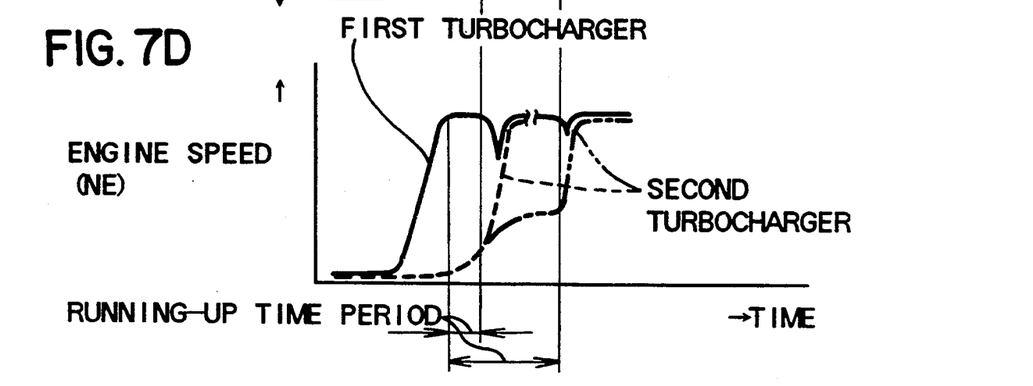
Figures 8A, 8B, 8C:
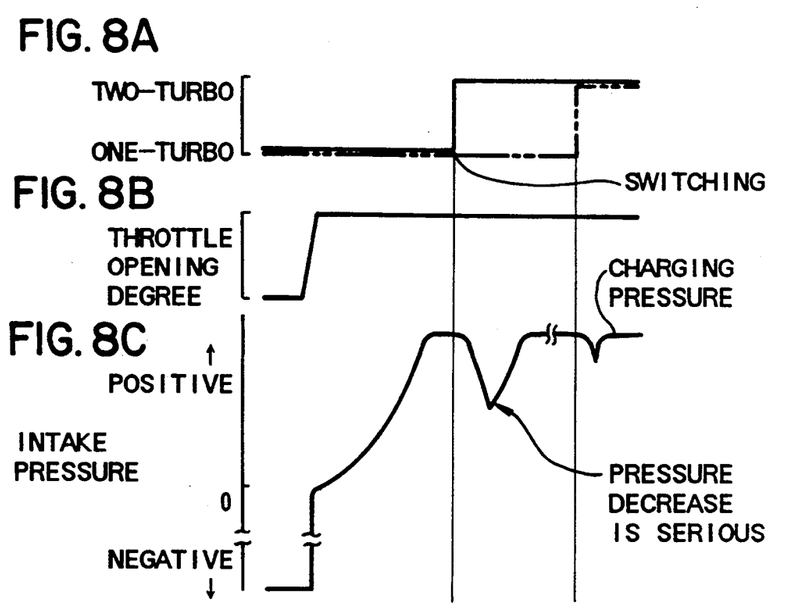
FIG. 8 is a graphical representation of the intake pressure and turbocharger speed versus time characteristic in accordance with the first embodiment of the invention.
Figure 8D:
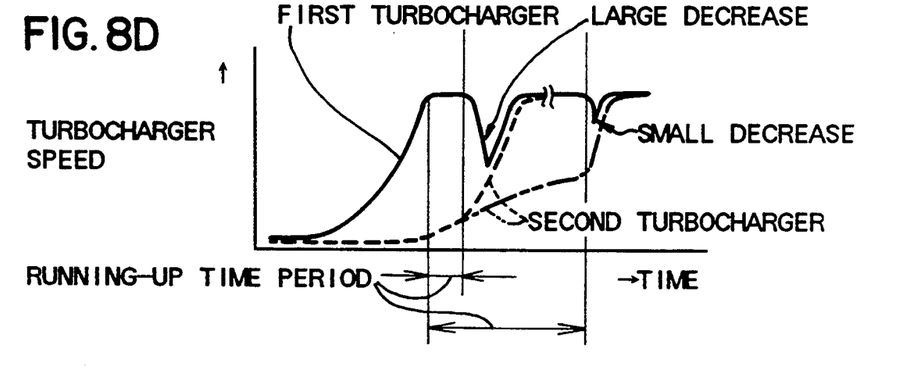

FIGS. 5 to 8 illustrate the operation of the first embodiment in more detail. As illustrated in FIG. 5, when the engine speed NE is low, more time is required for the intake pressure PM to reach an objective charging pressure and for the turbocharger speed to reach an objective speed. Therefore, as illustrated in FIG. 6, the lower the engine speed NE is, the larger the turbo lag is. A decrease in the charging pressure during the transition from "one-turbocharger-operation" to "two-turbocharger-operation" is greatly affected by this turbo lag of the second turbocharger 8. More particularly, at high engine speeds, as illustrated in FIG. 7, the decrease in the charging pressure during the transition is small even if the running-up period of time of the second turbocharger 8 by the exhaust bypass valve 41 is relatively short, because the turbo lag of the second turbocharger 8 is small at high engine speeds and the speed-up response of the second turbocharger 8 is high at high engine speeds. On the other hand, at low engine speeds, as illustrated in FIG. 8, if the running-up of the second turbocharger 8 is insufficient (i.e., if the running-up time period of the second turbocharger 8 is short), the decrease in the charging pressure during the transition is great because the response of the second turbocharger 8 is slow at low engine speeds. As a result, a serious decrease in the charging pressure during the transition occurs as shown in the left portion of FIG. 8.

However, in accordance with the first embodiment of the invention, since the running-up period TP of the second turbocharger 8 by the exhaust bypass valve 41 changes according to the engine speed NE and the the running period TP is set to be long when the engine speed is low, any serious decrease in the charging pressure, accompanied by a decrease in the torque, is suppressed as illustrated in the right portion of FIG. 8.

Figure 9:
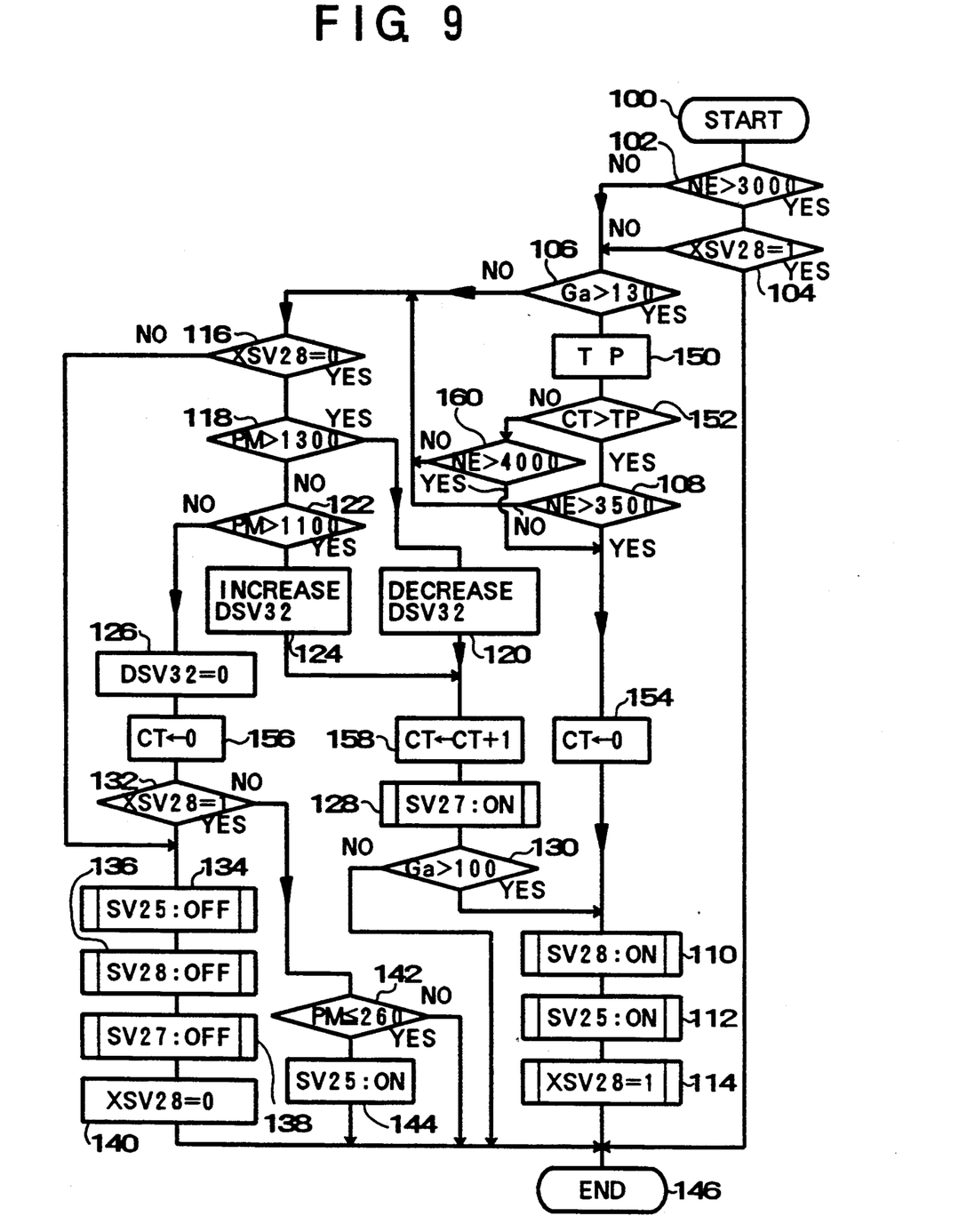
FIG. 9 is a flow chart of the charging control in accordance with a second embodiment of the invention.
Figure 10A:
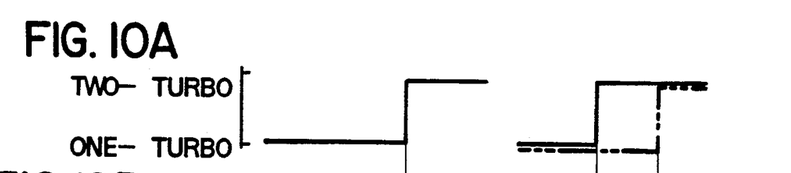
FIG. 10 is a graphical representation of the intake pressure and turbocharger speed versus time characteristic in accordance with the second embodiment of the invention.
Figure 10B:
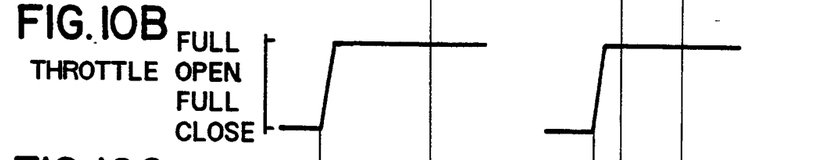
Figure 10C:
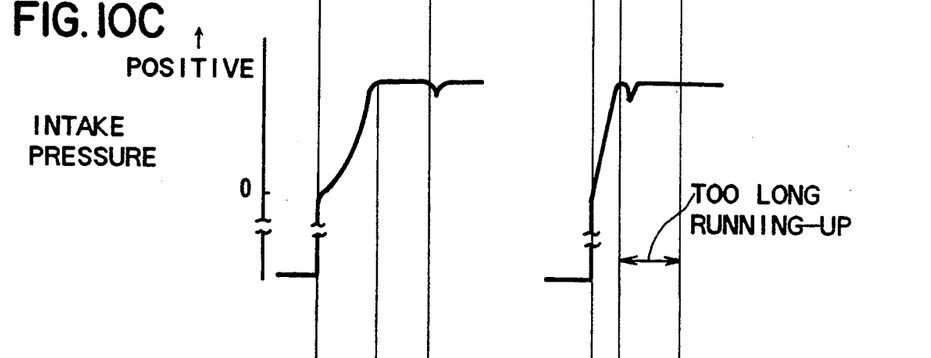
Figure 10D:
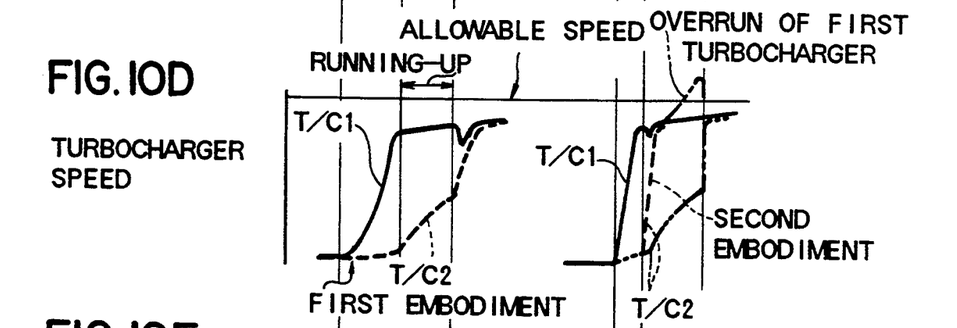
Figure 10E:
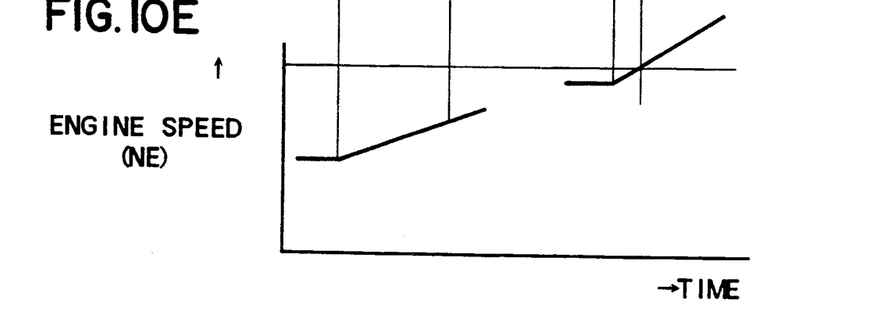

The second embodiment of the invention is illustrated in FIGS. 9 and 10. The second embodiment relates to an improvement in the charging control according to the first embodiment and aims to prevent a runover of the first turbocharger 7 which may occur at-high engine speeds if switching to "two-turbocharger-operation" is delayed too much at high engine speeds. In the second embodiment, as shown in FIG. 9, step 160 is added to the routine of FIG. 3. The remaining steps are the same as those of FIG. 3.

In FIG. 9, when the instant count time CT of the exhaust bypass valve 41 does not yet exceed the required running-up time period TP of the second turbocharger 8 at step 152, the routine proceeds to step 160. At step 160 it is determined whether the instant engine speed exceeds a predetermined high engine speed (for example, 4,000 rpm) which is higher than the speed defined in step 108. If NE is higher than the predetermined speed (for example, 4,000 rpm) at step 160, the routine proceeds to steps 110 and 112 via step 154 and the engine operation is switched to "two-turbocharger-operation". If NE is lower than the predetermined speed, the routine proceeds to step 16. This means that if the engine speed is high, the delay in switching to "two-turbocharger-operation" by steps 150 and 152 ends and the engine operation is immediately switched to "two-turbocharger-operation." In this instance, step 160 defines a means for stopping operation of steps 150 and 152 at high engine speeds which are higher than the speed defined in step 108 and switching the instant engine operation to "two-turbocharger-operation."

FIG. 10 illustrates operation of the second embodiment. If the engine speed rises very quickly and the charging is performed by the first turbocharger 7 only up to a predefined high engine speed in the first embodiment, the first turbocharger 7 may be choked and an overrun of the first turbocharger 7 may occur, as shown by the two-dotted chain line in a right portion of FIG. 10. Such an overrun of the first turbocharger 7 at high engine speeds will occur particularly when the running-up period of the second turbocharger 8 is too long. However, in accordance with the second embodiment, since the turbocharger-operation is switched to "two-turbocharger-operation" at high engine speeds even if the running-up period of the second turbocharger CT has not exceeded the required running-up period TP at step 152, an overrun of the first turbocharger 7 is effectively prevented, as shown by the full line in the right portion of FIG. 10.

Figure 11:
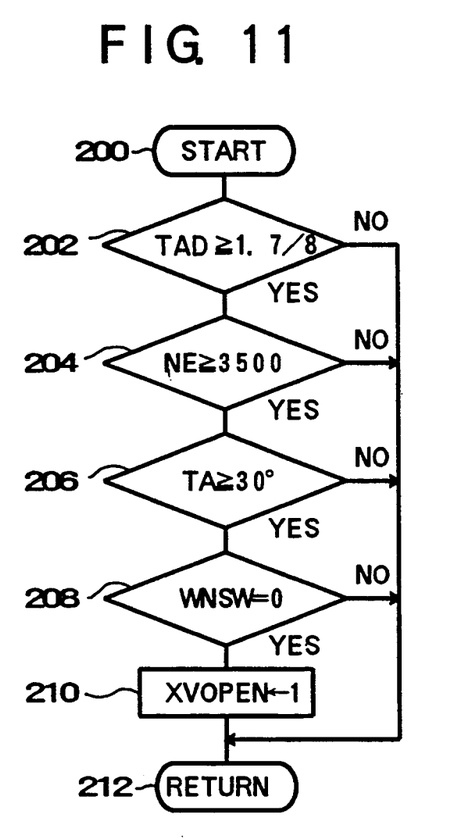
FIG. 11 is a flow chart of means for determining whether the instant engine operation is in high engine speed and rapid acceleration in accordance with a third embodiment of the invention.
Figure 12:
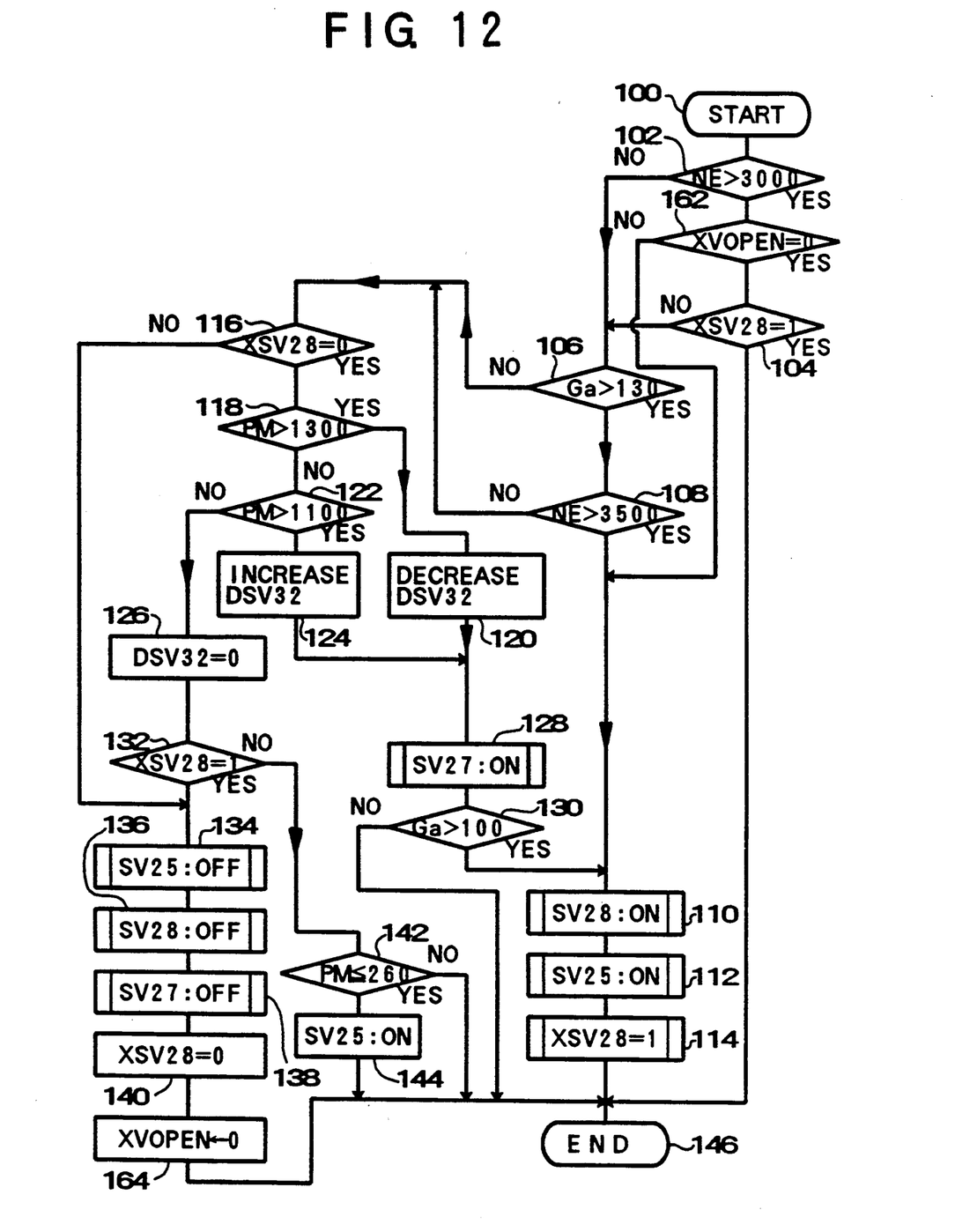
FIG. 12 is a flow chart of the charging control in accordance with the third embodiment of the invention.

The third embodiment of the invention is illustrated in FIGS. 11 and 12. The third embodiment relates to an improvement for suppressing an increase in the exhaust gas flow resistance during rapid acceleration at high engine speeds. In the third embodiment, as illustrated in FIG. 12, steps 162 and 164 are added to FIG. 2. The remaining steps are the same as those of FIG. 2. The routine of FIG. 11 is specific to the third embodiment.

With the routine of FIG. 11, it is determined whether the instant engine operation is at a high engine speed and rapid acceleration. The routine is entered at step 200 at predetermined time intervals (for example, 8 msec). Then, at step 202, it is determined whether the throttle valve opening speed DLTA is equal to or greater than a predetermined speed (for example, 1.7 degrees per 8 mm sec). If DLTA is lower than the predetermined speed, the routine proceeds to step 212. If DLTA is equal to or greater than the predetermined speed (that is, if the engine operation is at a rapid acceleration), the routine proceeds to step 204. At step 204, it is determined whether the instant engine speed NE is equal to or greater than a predetermined engine speed (for example, 3,500 rpm) which is equal to the speed defined in step 108. If the engine speed NE is lower than the predetermined speed, the routine proceeds to step 212. If the engine speed NE is equal to or greater than the predetermined speed (that is, if the engine operation is at a high engine speed operation), the routine proceeds to step 206. Steps 202 and 204 define engine operation determining means for determing whether the instant engine operation is at a high engine speed and rapid acceleration condition.

At step 206, whether the throttle angle TA is equal to or greater than a predetermined throttle angle (for example, 30°) is determined. If TA is smaller than the predetermined throttle angle, the routine proceeds to step 212. If TA is equal to or greater than the predetermined throttle angle, the routine proceeds to step 208. At step 208, it is determined whether the gear shift is at a neutral position. If the gear shift position WNSW is neutral (WNSW=1), the routine proceeds to step 212, and if the gear shift position WNSW is not neutral (WNSW=0), the routine proceeds to step 210, where flag XVOPEN is set to "1" which means that the engine operation is in a high engine speed and rapid acceleration. From step 210, the routine proceeds to step 212 where the cycle ends. It should be noted that steps 206 and 208 are not absolutely necessary.

In FIG. 12, if the instant engine speed is greater than the predetermined engine speed (for example, 3,000 rpm) at step 102, the routine proceeds to step 162, where it is determined whether flag XVOPEN is "0". If flag XVOPEN is "1" at step 162 (that is, if the engine operation is at a high engine speed and rapid acceleration), the routine proceeds directly to steps 110, 112, and 114, skipping steps 06 and 108,.so that the exhaust switching valve 17 is opened at once. If flag XVOPEN is "0" at step 162, the routine proceeds to step 104 and the same operation as described with reference to FIG. 2 is performed. When the engine operation is switched to "one-turbocharger-operation", the routine proceeds along the route including steps 134, 136, 138, and 140. On that route, step 164 is provided to clear flag XVOPEN to "0". Step 162 defines means for opening the exhaust switching valve 17 at once when the instant engine operation is at a high engine speed and rapid acceleration.

Operation of the third embodiment will now be explained. At high engine speeds, an increase in the intake air quantity during acceleration is slower than at low engine speeds, though the engine speed can rise quickly. Therefore, during acceleration at high engine speeds, opening of the exhaust switching valve 17 is delayed compared to that at low engine speeds, because the intake air quantity delays exceeding the predetermined value at step 106. As a result, the exhaust switching valve 17 may be a flow resistance during acceleration at high engine speeds. However, in the third embodiment, since the routine proceeds directly to steps 110 and 112, skipping step 106, when the engine operation is at a high engine speed and rapid acceleration, a delay in opening the exhaust switching valve 17 is prevented, to decrease an exhaust flow resistance and to increase the engine output.

Figure 13:
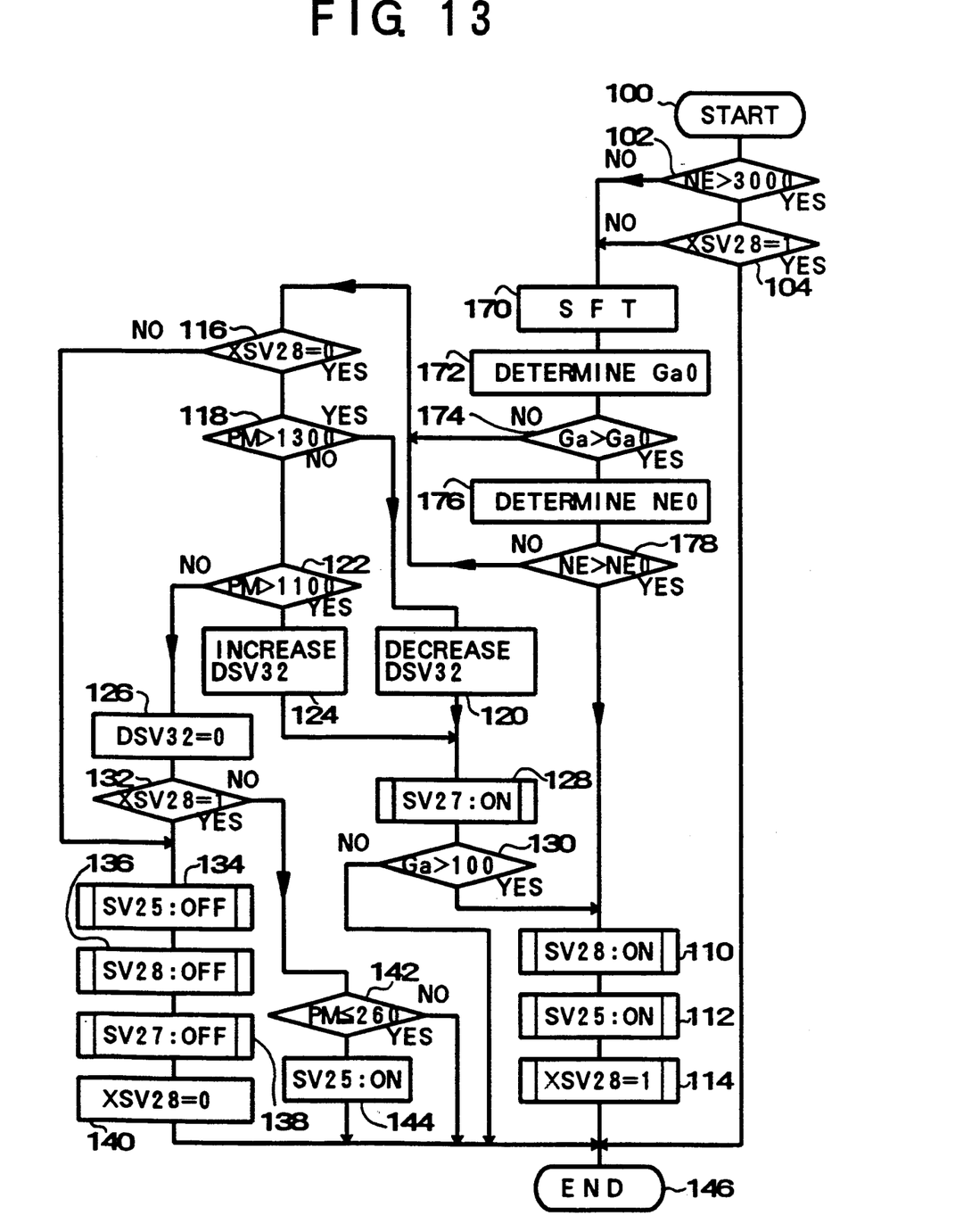
FIG. 13 is a flow chart of the charging control in accordance with a fourth embodiment of the invention.
Figure 14:
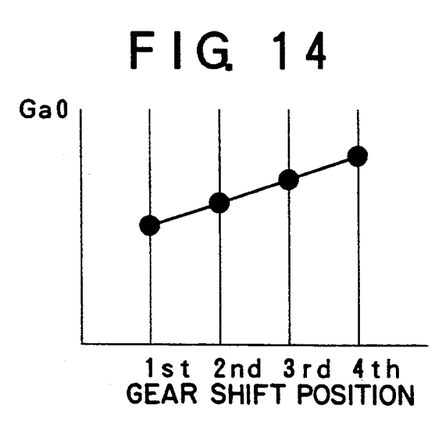
FIG. 14 is a graphical representation of the reference engine speed versus gear shift position map used in the charging control in accordance with the fourth embodiment of the invention.
Figure 15:
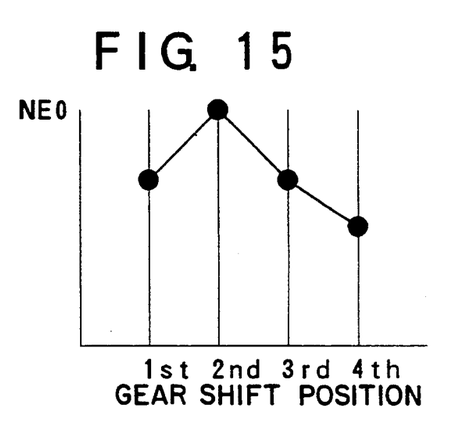
FIG. 15 is a graphical representation of the reference intake air quantity versus gear shift position map used in the charging control in accordance with the fourth embodiment of the invention.

The fourth embodiment of the invention is illustrated in FIGS. 13, 14, and 15. The fourth embodiment relates to an improvement for minimizing torque shock during the transition from "one-turbocharger-operation" to "two-turbocharger-operation" at low gear shift positions. In accordance with the fourth embodiment, as illustrated in FIG. 13, steps 106 and 108 of FIG. 2 are replaced with steps 170, 172, 174, 176, and 178 of FIG. 13, so that the intake air quantity Ga0 and the engine speed NE0 are varied in accordance with the gear shift position. The remaining steps of FIG. 13 are the same as those of FIG. 2.

In FIG. 13, the routine proceeds from steps 102 and 104 to step 170. At step 170, the instant gear shift position SFT is entered. Then, at step 172, a reference intake air quantity Ga0 is determined in accordance with the instant gear shift position SFT using a map, as shown in FIG. 14, or a table. In the map, it is predetermined that the lower the gear shift position is, the smaller the intake air quantity Ga0 is. Therefore, although the reference intake air quantity is a constant in FIG. 2, the reference intake air quantity Ga0 is variable in FIG. 13. Then, at step 174, it is determined whether the instant intake air quantity Ga is greater than Ga0. If Ga is equal to or less than Ga0, the routine proceeds to step 116, and if Ga is greater than Ga0, the routine proceeds to step 176. At step 176, a reference engine speed NE0 is determined using a map as shown in FIG. 15. In the map, it is predetermined that the lower the gear shift position SFT is, the greater the engine speed NE0 is, except with the first gear shift position. Then, at step 178, whether the instant engine speed NE is higher than the reference engine speed NE0 is determined. If NE is equal to or less than NE0, the routine proceeds to step 116, and if NE is greater than NE0, the routine proceeds to step 110.

Operation of the fourth embodiment will now be explained. During acceleration at a constant throttle opening speed, the intake air quantity can reach the object quantity in a shorter period of time at a low gear shift position than at a high gear shift position. As a result, during acceleration at low gear shift positions, the running-up of the second turbocharger 8 is insufficient, and a relatively large torque shock occurs. In accordance with the fourth embodiment, since the reference engine speed NE0 with a low gear shift position, except with the first gear shift position, is set to be high compared to the reference speed of the high gear shift position, switching to "two-turbocharger-operation" is delayed and the exhaust bypass valve 41 is driven for a long period of time. As a result, the second turbocharger 8 is sufficiently run-up at the low gear shift position and a torque shock during the transition from "one-turbocharger-operation" to "two-turbocharger-operation" is suppressed. However, at the first gear shift position, if the reference engine speed NE0 is set high, the flow resistance increases and the engine output is decreased. In order to prevent this decrease in the engine output, the reference engine speed NE0 is set relatively low at the first gear shift position.

The rate at which the intake air quantity increases is greater at low gear shift positions than at high gear shift positions. In the case of climbing, when the intake air quantity is increased during acceleration, the intake air quantity increases although the engine speed increases only a little. Therefore, in the case of climbing, the exhaust switching valve 17 must be opened earlier at low gear shift positions than at high gear shift positions, in order to suppress an increase in flow resistance. In the fourth embodiment, since the reference intake air quantity is set lower at low gear shift positions than at high gear shift positions, the exhaust switching valve 17 can open at a relatively small intake air quantity at low gear shift positions, so that the engine output can be maintained high, even during acceleration when climbing.

Although several embodiments of the invention have been described in detail above, those skilled in the art will appreciate that various modifications and alterations can be made to the particular embodiments shown without materially departing from the novel teachings and advantages of the invention. Accordingly, all such modifications and alterations are included within the spirit and scope of the present invention as defined by the following claims.

What is claimed is:

1. A charging control apparatus for an internal combustion engine with a dual turbocharger system comprising:

a multi-cylinder internal combustion engine having at least one air intake and at least one exhaust outlet, wherein the engine includes first and second groups of cylinders;

an exhaust manifold connected with the at least one engine exhaust outlet, the exhaust manifold including a first portion connected to the first group of the cylinders and a second portion connected to the second group of the cylinders, the first portion and the second portion of the exhaust manifold being joined to each other with a connecting conduit;

a first turbocharger and a second turbocharger arranged in parallel with each other, each said turbocharger including a turbine and a turbine driven compressor, the turbines being connected to the engine exhaust outlet with the exhaust manifold and the compressors being connected to the air intake of the engine;

an air intake line including a first intake conduit connected with the first turbocharger compressor and a second intake conduit connected with the second turbocharger compressor, the air intake line being connected with the engine air intake;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed;

an intake switching valve installed downstream of the second turbocharger compressor in the second intake conduit for opening and closing the second intake conduit, and an exhaust switching valve installed in the second exhaust conduit for opening and closing the second exhaust conduit, the intake switching valve and the exhaust switching valve being closed to produce a one-turbocharger-operation, wherein only the first turbocharger operates, when an instant intake air quantity is equal to or less than a reference intake air quantity and an instant engine speed is equal to or less than a reference engine speed, and the intake switching valve and the exhaust switching valve being opened to produce a two-turbocharger-operation, wherein both the first turbocharger and the second turbocharger operate, when the instant intake air quantity exceeds the reference intake air quantity and the instant engine speed exceeds the reference engine speed;

an exhaust bypass conduit connecting a portion of the second exhaust conduit upstream of the exhaust switching valve with one of a portion of the first exhaust conduit downstream of the first turbocharger turbine and a portion of the second exhaust conduit downstream of the exhaust switching valve;

an exhaust bypass valve installed in the exhaust bypass conduit for opening and closing the exhaust bypass conduit, the exhaust bypass valve running-up the second turbocharger before engine operation is switched from one-turbocharger-operation to two-turbocharger-operation when the exhaust bypass valve is open;

means for changing the reference intake air quantity in accordance with a gear shift position; and means for changing the reference engine speed in accordance with the gear shift position.

2. An apparatus according to claim 1, wherein the means for changing the reference intakes air quantity includes a map in which it is predetermined that the lower the gear shift position is, the smaller the reference intake air quantity is.

3. An apparatus according to claim 1, wherein the means for changing the reference engine speed includes a map in which it is predetermined that the lower the gear shift position is, the higher the reference engine speed is, except a first gear shift position.

4. An apparatus according to claim 1, wherein the means for changing the reference engine speed includes a map in which it is predetermined that a reference engine speed at a first gear shift position is lower than a reference engine speed at a second gear shift position.

* * * * *